Sept. 28, 1937.　　　C. A. W. BALL　　　2,094,518
COPYING MACHINE
Filed Feb. 6, 1937　　　2 Sheets-Sheet 1
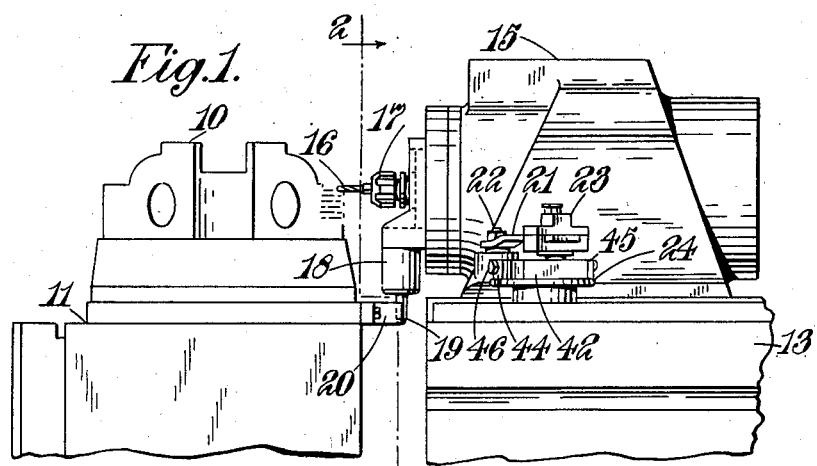
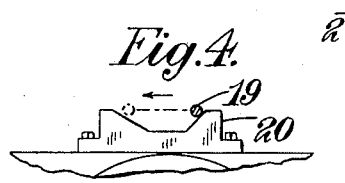
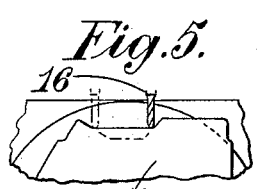
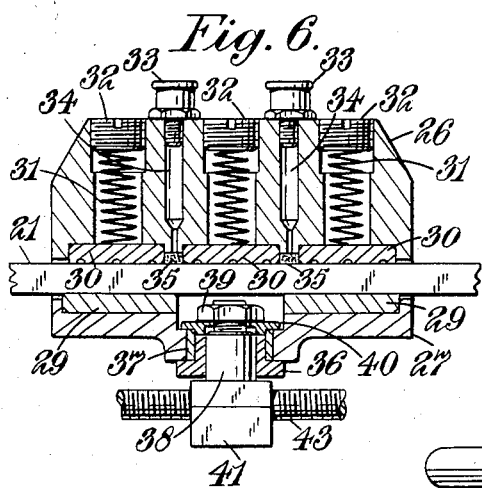
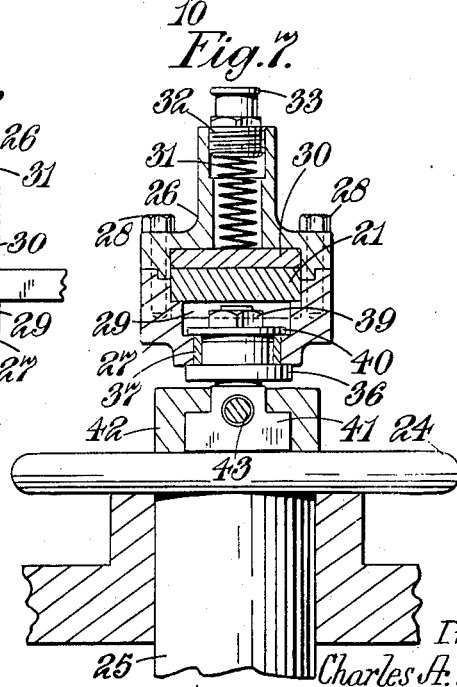
Inventor
Charles A. W. Ball
by Wilkinson & Mawhinney
Attorneys.

Sept. 28, 1937.  C. A. W. BALL  2,094,518
COPYING MACHINE
Filed Feb. 6, 1937  2 Sheets-Sheet 2
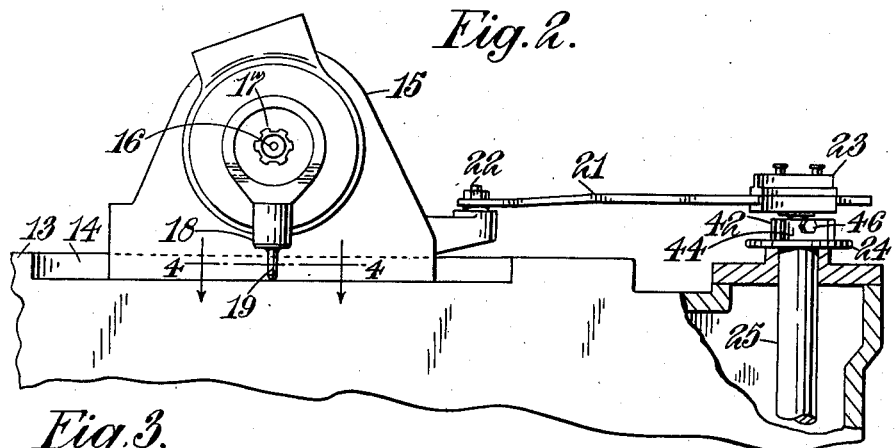
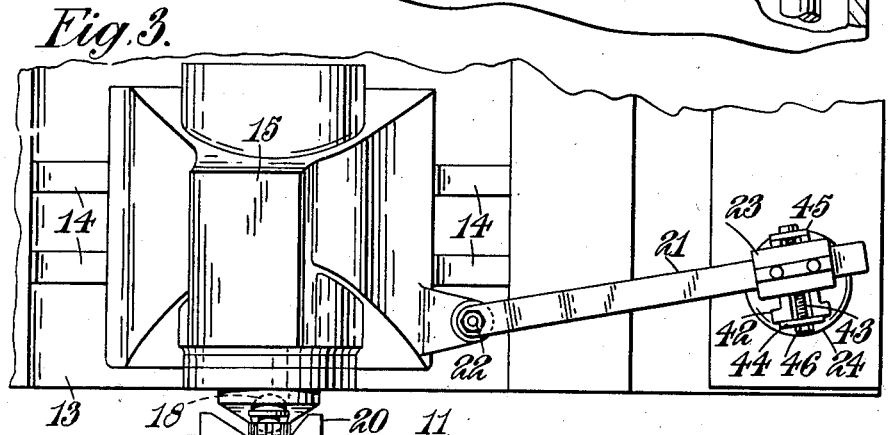
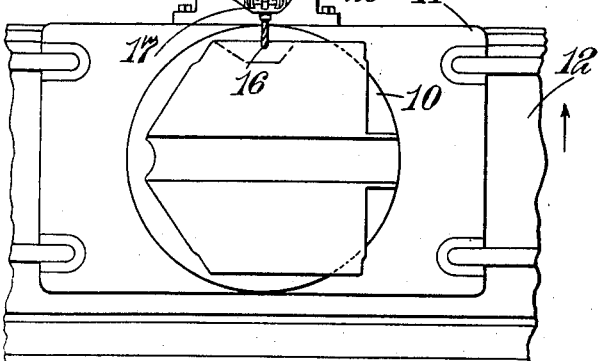
Inventor
Charles A. W. Ball
by Wilkinson & Mawhinney
Attorneys.

Patented Sept. 28, 1937

2,094,518

UNITED STATES PATENT OFFICE 2,094,518

COPYING MACHINE

Charles Arthur Walter Ball, Bristol, England, assignor to The Bristol Aeroplane Company, Limited, Bristol, England, a British company Application February 6, 1937, Serial No. 124,486
In Great Britain February 26, 1936

2 Claims. (Cl. 90—13.4)

This invention is for improvements in or relating to copying machines of the kind in which a tracer element co-operates with a former or pattern to limit the relative movement between a cutter and the work. The invention is a modification of that described in United States Patent No. 2,006,123.

According to the present invention, a copying milling machine of the kind described comprises a continuously rotated crank or eccentric of large throw and a connecting rod driven thereby, wherein the connecting rod reciprocates the cutter with respect to the work and a tracer element with respect to a former or pattern, and wherein the said connecting rod is formed in two parts which interengage by a friction coupling so that the amplitude of movement of the cutter with respect to the work is limited by the engagement of the tracer element with the former or pattern irrespective of the throw of the crank. By the expression "large throw" is meant a throw which is at least as large as the corresponding necessary movement of the cutter with respect to the work. The connecting rod may comprise a flat bar pivoted at one end to the part to be reciprocated and embraced near its other end by a hollow block which frictionally engages it and which is rotatably mounted on a crank-pin.

A specific embodiment of the invention will now be described by way of example, with reference to the accompanying drawings of which:—

Figure 1 is an end elevation of a milling machine according to the invention adapted for the operation of cutting the fins in the cylinder head of an air-cooled internal-combustion engine, Figure 2 is an elevation on the line 2—2 of Figure 1, Figure 3 is a plan view of the machine, Figure 4 is a detail plan on the line 4—4 of Figure 2, Figure 5 is a detail of part of Figure 3 showing the cutter and the work, and Figures 6 and 7 are sectional elevations of the friction block and associated parts, Figure 7 being a view at right-angles to Figure 6.

As shown first in Figures 1, 2, and 3, a cylinder head 10 which is to be cut with fins for air cooling is carried on a work-table 11 which is adjustable from side to side as seen in Figure 3 on a base 12. Situated alongside the base 12 is another table 13 grooved as shown at 14 to engage with downwardly-extending straight tongues (not shown) on a reciprocating cutter head 15.

The cutter head 15 carries a milling cutter 16 supported in a suitable chuck 17 and driven by suitable mechanism about its own axis in the usual way. The cutting head also carries a downwardly-projecting boss 18 which, at its lower end, is formed with a pin 19 which constitutes the tracer element above described. The pin 19 co-operates, in a manner which will be described below, with a former plate 20 bolted on to the work-table 11.

Pivoted about a vertical pin 22 on the cutter head 15 is a flat metal bar 21 the other end of which is embraced by a hollow friction block 23 eccentrically mounted on a table 24 which is driven by a shaft 25.

The construction of the friction block 23 and associated parts is shown in Figures 6 and 7. The block comprises two parts 26 and 27 secured together by studs 28. The lower part 27 is channel-shaped so as to accommodate the flat bar 21 which is of rectangular cross-section as shown in Figure 7 and underneath this bar the part 27 is recessed to accommodate friction pads 29 of fibre, or other suitable material, which bear against the lower face of the bar 21. The upper part 26 of the friction block is similarly recessed to accommodate friction pads 30 which are spring-pressed downwardly on to the bar by compression-springs 31 housed in suitable recesses which are closed at their upper ends by screw-threaded plugs 32. The relatively sliding surfaces may be lubricated by oilers 33 which supply oil through vertical ducts 34 to felt strips 35 engaging the upper surface of the bar 21.

The lower part 27 of the friction block is formed with a central bore to engage, through the intermediary of bushings 36 and 37, with a crank-pin 38 which is retained in the bore by a nut 39 engaging a washer 40. The pin 38 is integrally formed with a slipper block 41 which slides in a channel-shaped member 42 formed integrally with the rotating table 24 (see also Figure 2). The slipper block 41 is formed with a screw-threaded bore which engages a threaded rod 43 rotatably mounted in end-plates 44 and 45 on the channel-shaped guide 42 (see Figure 3). The rod 43 is formed at one end with a nut portion 46 whereby it may be rotated to adjust the position of the slipper block 41 in the guide 42. Suitable means (not shown) may be provided for lubricating the crank-pin 38.

The operation of the machine will now be described.

The work-table 11 is adjusted to the correct position on the base 12 and locked in this position by means of suitable clamping nuts. A former plate 20 is now selected according to the shape of the cut which is to be made and is bolted to the work-table 11 in the position shown in Figure 3. The work-table 11 is movable towards and away from the cutter head and during the operation of the machine it is automatically fed slowly towards the cutter as indicated by the arrow in Figure 3. However, when the machine is to be set for operation it is advanced by hand until the tip of the cutter 16 just touches the work.

The rod 43 is now rotated by means of the nut 46 until the desired degree of eccentricity of the friction block with respect to the table 24 has been obtained. This eccentricity is determined by the maximum length of cut which is required of the cutter and the radius of eccentricity is so selected that the throw of the crank-pin 38 is slightly larger than this maximum cut.

The machine is now set in motion so that the shaft 25 rotates and the crank-pin 38 rotates about the axis of the shaft 25. The bar 21 therefore tends to be driven in the manner of a connecting rod and to reciprocate the cutter head 15 with an amplitude equal to the throw of the crank. The amplitude of the cutter head, however, is limited by the engagement of the former pin 19 with the former plate 20 in a manner which will now be described with reference to Figures 4 and 5.

Assuming the former pin 19 to be in the position shown in full lines in Figure 4 when the crank is beginning its movement from the right-hand dead centre towards the left, the pin 19 will move to the left in the direction of the arrow and the cutter 16 (Figure 5) will move in exactly the same way with respect to the work 10. Movement of the former pin 19 continues until it collides with the former plate as shown by the dotted lines. The cutter 16 will then have reached the position shown by the dotted lines in Figure 5. The reciprocating movement of the cutter head 15 towards the left is now arrested and the rotation of the crank towards its left-hand dead centre takes place by the slipping of the friction block 23 with respect to the bar 21 which swings idly about the pin 22. Immediately the crank has passed its left-hand dead centre, the bar 21 is in tension and the former pin 19 and the cutter 16 begin their return movement towards the right until the former pin again collides with the former plate 20, and so on. This operation continues until the former pin has reached the bottom of the trapesium-shaped notch in the former plate and automatic means may be provided to stop the machine at this point. Where the diameter of the cutter is equal to the required space between adjacent fins, each space may be cut by a single complete traversal. The machine is then reset by moving the cylinder head up or down with respect to the cutter so as to bring the cutter into line with a fresh inter-fin space.

It will be understood that the crank and connecting rod might, if desired, be applied to the work-table 11 so as to reciprocate the work and former plate with respect to the cutter and former pin. Also, the continuous forward feed of the work-table with respect to the cutter might be modified by maintaining the work stationary and feeding the cutter automatically towards the work.

The invention may be applied to the operation of milling any complex shape, but its principal application is to the cutting of shapes by a movement lying wholly in one plane as distinguished from the oscillating movement described with reference to the drawings of United States Patent No. 2,006,123.

I claim:—

1. A milling machine comprising a work-carrier and a tool-carrier co-operating therewith, a former and a tracer-element co-operating therewith, a crank, a hollow block carried by the said crank, a bar passing through the said hollow block and pivotally connected both to the tool-carrier and the tracer-element so as to reciprocate them simultaneously with respect to the work-carrier and the former respectively and frictional means engaging both the said bar and the said block so that the bar slips in the block, and the tool ceases to move with respect to the work, whenever the tracer-element is arrested by its engagement with the former.

2. A copy milling machine comprising a work-carrier, a tool-carrier, a tracer-element, a former carried by the work-carrier, a continuously-rotated crank of large throw, a connecting rod formed in two parts one of which is driven by said crank and the other of which is connected to the tool-carrier to reciprocate it with respect to the work-carrier and to reciprocate the tracer-element with respect to the former, and a friction-coupling interconnecting said two parts of said connecting rod so that the amplitude of movement of the tool-carrier with respect to the work-carrier is limited by the engagement of the tracer-element with the former.

CHARLES ARTHUR WALTER BALL.